UNITED STATES PATENT OFFICE.

HERMANN ENDEMANN, OF BROOKLYN, ASSIGNOR TO WILHELM PICK-HARDT AND ADOLF KUTTROFF, OF NEW YORK, N. Y.

PRODUCTION OF SULPHO-ACID COMPOUND OF BETANAPHTHOL.

SPECIFICATION forming part of Letters Patent No. 277,864, dated May 15, 1883.

Application filed August 2, 1882. (Specimens.)

*To all whom it may concern:*

Be it known that I, HERMANN ENDEMANN, a citizen of the United States, residing at Brooklyn, in the county of Kings and State of New York, have invented new and useful Improvements in Sulpho-Acid Compounds of Betanaphthol, of which the following is a specification.

This invention relates to a new sulpho-acid compound of betanaphthol which can be used with advantage in the preparation of coloring-matters.

In carrying out my invention I dissolve one part of betanaphthol in four parts of fuming sulphuric acid of the specific gravity of 1.95 at 26° centigrade. Thereby the temperature rises; but it must not be allowed to rise above 125° centigrade. I then maintain the temperature of the mixture at 115° to 125° centigrade for two hours. The temperature is then reduced to from 100° to 110° centigrade, and kept there, while more fuming sulphuric acid is added from time to time. The reaction is considered at an end when a sample of the solution, after dilution with water, and after having been rendered alkaline with ammonia, does not produce the well-known red dye on the addition of diazo-betanaphthol, or until such reaction becomes practically reduced to a minimum.

In order to remove the excess of sulphuric acid, the product, after cooling, is poured into water, and the mixture is heated to boiling while an excess of milk of lime is added. The mixture is then filtered. The solution contains the lime salt of my new sulpho-acid compound of betanaphthol. From this the lime may be separated by the addition of a sufficient quantity of sulphuric acid, or the same may be converted into other salts by simple chemical reactions. It is converted into the soda salt, for instance, by adding to the solution containing the lime salt a quantity of carbonate of soda, whereby carbonate of lime is thrown down, while the soda salt of the new sulpho-acid compound remains in solution. This is obtained in a solid form by evaporation; but it may be used for the manufacture of coloring-matters in solution concentrated to a convenient degree.

My new sulpho-acid compound of betanaphthol is freely soluble in water, and gives, with water, brownish solutions, which, on saturation with an alkali or an alkaline earth, change to a yellow and show a beautiful green fluorescence.

By treating my new sulpho-acid compound with nitric acid a sulpho-acid of nitrobetanaphthol is obtained. The sodium salt of my sulpho-acid compound is very slightly soluble in alcohol.

My new sulpho-acid compound can be readily distinguished from the disulpho-acids of betanaphthol described by Baum in his Patent No. 210,233 by the green fluorescence above named. The disulpho-acids show a bluish fluorescence also by the reaction with diazotized betanaphthylamine. When an alkaline solution of the disulpho-acids of betanaphthol is brought together with diazotized betanaphthylamine or diazotized xylidine the mixture assumes at once a deep red color. When an alkaline solution of my new sulpho-acid compound is brought together with diazotized betanapthylamine or diazotized xylidine a barely perceptible change in color takes place.

My new sulpho-acid compound can also be readily distinguished from the monosulpho-acids of betanaphthol of Schaeffer and Rumpff. By the action of nitric acid on my sulpho-acid compound a soluble nitrosulpho-acid is formed. Schaeffer's monosulpho-acid of betanaphthol forms no nitro compound, and Rumpff's monosulpho-acid of betanaphthol, when treated with nitric acid, produces a nitro compound, but when brought together with diazo-betanaphthylamine shows the same reaction as the disulpho-acids of Baum.

What I claim as new, and desire to secure by Letters Patent, is—

The sulpho-acid compound of betanaphthol prepared as herein described, and having the characteristics herein set forth.

In testimony whereof I have hereunto set my hand and seal in the presence of two subscribing witnesses.

H. ENDEMANN. [L. S.]

Witnesses:
W. HAUFF,
JAMES L. NORRIS.